United States Patent
Hong et al.

(10) Patent No.: US 9,955,193 B1
(45) Date of Patent: Apr. 24, 2018

(54) IDENTIFYING TRANSITIONS WITHIN MEDIA CONTENT ITEMS

(71) Applicant: Google LLC, Mountain View, CA (US)

(72) Inventors: Jun Hong, Sunnyvale, CA (US); Yun Shi, Sunnyvale, CA (US); Ramesh Sarukkai, Los Gatos, CA (US); Min-hsuan Tsai, Grapevine, TX (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/634,044

(22) Filed: Feb. 27, 2015

(51) Int. Cl.
*H04N 21/234* (2011.01)
*H04N 21/233* (2011.01)
*H04N 21/81* (2011.01)
*H04N 21/61* (2011.01)

(52) U.S. Cl.
CPC ..... *H04N 21/23424* (2013.01); *H04N 21/233* (2013.01); *H04N 21/23418* (2013.01); *H04N 21/6125* (2013.01); *H04N 21/812* (2013.01)

(58) Field of Classification Search
CPC .. G06Q 30/0241; G06Q 50/01; H04N 21/812; H04N 21/233; H04N 21/23418; H04N 21/23424; H04N 21/8133; H04N 21/6125; H04N 21/84; H04N 21/8456; H04N 5/147; H04N 7/173
See application file for complete search history.

(56) References Cited

U.S. PATENT DOCUMENTS

| | | | | |
|---|---|---|---|---|
| 7,634,785 B2 * | 12/2009 | Smith | ............... | G11B 27/036 725/102 |
| 2008/0262912 A1 * | 10/2008 | Gargi | ............... | G06Q 30/0241 705/14.4 |
| 2009/0067806 A1 * | 3/2009 | Sengamedu, Sr. | . | H04N 21/4331 386/353 |
| 2009/0079871 A1 | 3/2009 | Hua et al. | | |
| 2009/0092374 A1 * | 4/2009 | Kulas | ............... | H04N 21/6125 386/248 |
| 2014/0093164 A1 | 4/2014 | Noorkami et al. | | |

FOREIGN PATENT DOCUMENTS

WO    2010029472 A1    3/2010

OTHER PUBLICATIONS

Jordi Mas and Gabriel Fernandez, "Video Shot Boundary Detection Based on Color Histogram", Digital Television Center (CeTVD), La Salle School of Engineering, Ramon Llull University, Barcelona, Spain (11 pages).
Lie Lu, Hao Jiang and Hongjiang Zhang, "A Robust Audio Classification and Segmentation Method", Microsoft Research, China, ACM Multimedia 2001, (9 pages).

* cited by examiner

Primary Examiner — Hai V Tran
(74) Attorney, Agent, or Firm — Foley & Lardner LLP (57) ABSTRACT

Systems and methods are disclosed for identifying transitions within media content items. In one implementation, a processing device process a first media content item, the first media content item being associated with a transition, to identify one or more characteristics associated with the transition. The processing device processes a second media content item to identify at least one of the one or more characteristics at a chronological interval of the second media content item. The processing device receives a sponsored content item. The processing device provides, during a presentation of the second media content item, the sponsored content item at the chronological interval.

18 Claims, 5 Drawing Sheets

IDENTIFYING TRANSITIONS WITHIN MEDIA CONTENT ITEMS

TECHNICAL FIELD

Aspects and implementations of the present disclosure relate to data processing, and more specifically, to identifying transitions within media content items.

BACKGROUND

Audio and video content can be stored on data servers and provided to users for listening/viewing over the Internet. Applications for supporting the listening/viewing of such audio and video content may be browser-based, or may run independently of a browser.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a processing device process a first media content item, the first media content item being associated with a transition, to identify one or more characteristics associated with the transition. The processing device processes a second media content item to identify at least one of the one or more characteristics at a chronological interval of the second media content item. The processing device receives a sponsored content item. The processing device provides, during a presentation of the second media content item, the sponsored content item at the chronological interval.

In another aspect, a processing device receives a media content item with respect to which one or more transitions have been identified. The processing device provides, during a presentation of the media content item, a sponsored content item in relation to at least one of the one or more transitions

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to identifying transitions within media content items. The systems and methods disclosed can be applied to media content such as audio and/or video content, images, and/or any other content that can be collected and/or disseminated such as via a media sharing service or website. More particularly, various technologies enable the presentation of sponsored content items (e.g., advertisements) within a presentation of a media content item (e.g., by pausing the media content item at one or more points during the presentation, presenting the advertisement, and then resuming presentation of the media content item). In order to improve the viewing experience for viewers in such scenarios, one or more transition or break points can be identified within the media content item (e.g., at points in which there is a transition from one scene, topic, etc., to another), and sponsored content items can be presented at such points. However, traditionally such transitions have been identified via manual review (e.g., by a human reviewer who reviews each individual media content items and identifies appropriate transitions manually). Thus, in scenarios in which a large number of media content items are available, it may be inefficient (both from a time and cost standpoint) to have all of such media content items manually reviewed in such a way.

Accordingly, described herein in various embodiments are technologies that enable identifying transitions within media content items. For example, as described herein, an initial body of reference content (e.g., videos with respect to which transitions have already been identified, e.g., at particular chronological intervals) can be processed (e.g., using one or more machine learning techniques) to identify one or more characteristics (e.g., audio characteristics, visual characteristics) that correspond to the transition. Having identified such characteristics (e.g., across multiple videos), other content (e.g., newly uploaded videos) can be processed to identify comparable characteristics (e.g., audio/video characteristics). Having identified such a transition within a media content item, upon presenting such a media content item (e.g., to a viewer), sponsored content items can be presented. In doing so, such transitions can be identified and sponsored content items can be provided without necessitating manual review or annotation.

Figure 1:
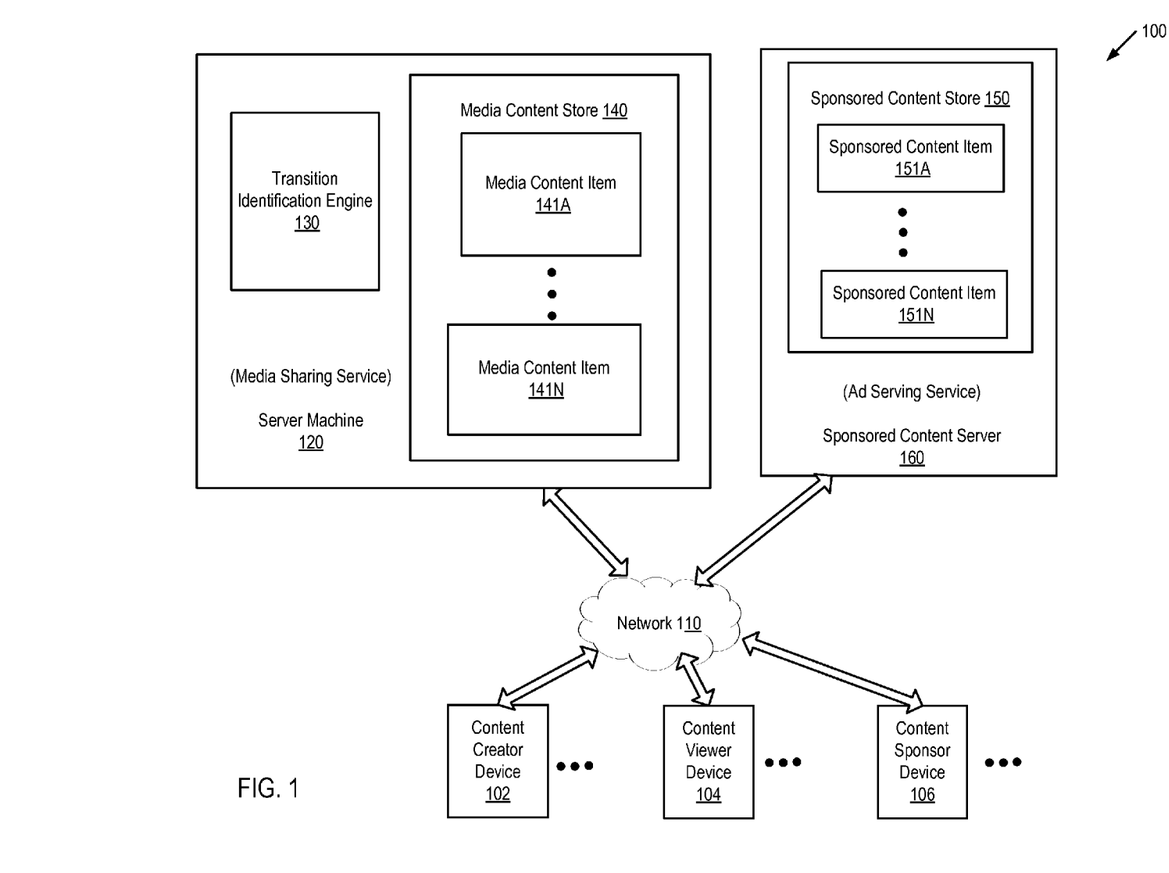
FIG. 1 depicts an illustrative system architecture, in accordance with one implementation of the present disclosure.

FIG. 1 depicts an illustrative system architecture 100, in accordance with one implementation of the present disclosure. The system architecture 100 includes content creator device 102, content viewer device 104, content sponsor device 106, server machine 120, sponsored content server 160. These various elements or components can be connected to one another via network 110, which can be a public network (e.g., the Internet), a private network (e.g., a local area network (LAN) or wide area network (WAN)), or a combination thereof.

Content creator device 102 can be a rackmount server, a router computer, a personal computer, a portable digital assistant, a mobile phone, a laptop computer, a tablet computer, a camera, a video camera, a netbook, a desktop computer, a media center, any combination of the above, or any other such computing device capable of implementing the various features described herein. In certain implementations, content creator device 102 can enable a media content creator, such as a user or entity that creates media content (e.g., audio, video, images, etc.) to provide (e.g., upload) such media content items to a server machine (e.g., server machine 120), such as a server configured as a media sharing service that can allow other users to view or otherwise acquire/obtain access to the provided media content items via the service. Additionally, content creator device 102 may run an operating system (OS) that manages hardware and software of the content creator device 102. Various applications, such as mobile applications ('apps'), web browsers, etc. (not shown) may run on the content creator device (e.g., on the OS of the content creator device). Such applications can, for example, enable a user to capture media content (e.g., an audio clip, a video clip, etc.), provide media content (e.g., upload media content to a central server and/or transmit it to another user), receive media content (e.g., via network 110), and/or view, display, or otherwise present media content (e.g., playing a video, listening to a song, etc.), such as via the content creator device 102.

Content viewer device 104 can be a rackmount server, a router computer, a personal computer, a portable digital assistant, a mobile phone, a laptop computer, a tablet computer, a camera, a video camera, a netbook, a desktop computer, a media center, any combination of the above, or any other such computing device capable of implementing the various features described herein. In certain implementations, content viewer device 104 can enable a user, such an individual to interact with one or more services (e.g., media sharing services, social networks, etc.) such as in order to view and/or or otherwise interact with various media content items and/or related content. Additionally, content viewer device 104 may run an operating system (OS) that manages hardware and software of the content viewer device 104. Various applications, such as mobile applications ('apps'), web browsers, etc. (not shown) may run on the content owner device (e.g., on the OS of the content owner device). Such applications can, for example, enable a user to capture media content (e.g., an audio clip, a video clip, etc.), provide media content (e.g., upload media content to a central server and/or transmit it to another user), receive media content (e.g., via network 110), and/or view, display, or otherwise present media content (e.g., playing a video, listening to a song, etc.), such as via the content viewer device 104.

Content sponsor device 106 can be a rackmount server, a router computer, a personal computer, a portable digital assistant, a mobile phone, a laptop computer, a tablet computer, a camera, a video camera, a netbook, a desktop computer, a media center, any combination of the above, or any other such computing device capable of implementing the various features described herein. In certain implementations, content sponsor device 106 can enable a user/entity, such an advertiser to interact with one or more services (e.g., an ad serving service) such as in order to provide sponsored content items (e.g., advertisements) within media sharing services, social networks, etc. Additionally, content sponsor device 106 may run an operating system (OS) that manages hardware and software of the content sponsor device 106. Various applications, such as mobile applications ('apps'), web browsers, etc. (not shown) may run on the content owner device (e.g., on the OS of the content owner device). Such applications can, for example, enable a user to capture media content (e.g., an audio clip, a video clip, etc.), provide media content (e.g., upload media content to a central server and/or transmit it to another user), receive media content (e.g., via network 110), and/or view, display, or otherwise present media content (e.g., playing a video, listening to a song, etc.), such as via the content sponsor device 106.

Server machine 120 can be a rackmount server, a router computer, a personal computer, a portable digital assistant, a mobile phone, a laptop computer, a tablet computer, a camera, a video camera, a netbook, a desktop computer, a media center, any combination of the above, or any other such computing device capable of implementing the various features described herein. Server machine 120 can include components such as transition identification engine 130, and media content store 140. The components can be combined together or separated in further components, according to a particular implementation. It should be noted that in some implementations, various components of server machine 120 may run on separate machines. Moreover, some operations of certain of the components are described in more detail below with respect to FIG. 2.

Media content store 140 can be hosted by one or more storage devices, such as main memory, magnetic or optical storage based disks, tapes or hard drives, NAS, SAN, and so forth. In some implementations, media content store 140 can be a network-attached file server, while in other implementations media content store 140 can be some other type of persistent storage such as an object-oriented database, a relational database, and so forth, that may be hosted by the server machine 120 or one or more different machines coupled to the server machine 120 via the network 110, while in yet other implementations media content store 140 may be a database that is hosted by another entity and made accessible to server machine 120.

Media content store 140 can include media content items 141A-141N. In certain implementations, media content items 141A-141N can correspond to media content itself (e.g., audio clips, video clips, images, etc.) and can be provided, for example, by a content owner. Moreover, in certain implementations, server machine 120 can be configured to allow full and/or substantially unlimited access to such media content items. Accordingly, users wishing to access or view such media content items via the media sharing service can be enabled, under most circumstances, to do so. Alternatively, in certain implementations server machine 120 can be configured to utilize media content items 141 for reference purposes (e.g., to compare to other media content items to identify similarities/matches between the various media content items), though such media content items are not accessible to users/viewers of the media sharing service.

Media content store 140 can be hosted by one or more storage devices, such as main memory, magnetic or optical storage based disks, tapes or hard drives, NAS, SAN, and so forth. In some implementations, media content store 140 can be a network-attached file server, while in other implementations media content store 140 can be some other type of persistent storage such as an object-oriented database, a relational database, and so forth, that may be hosted by the server machine 120 or one or more different machines coupled to the server machine 120 via the network 110, while in yet other implementations media content store 140 may be a database that is hosted by another entity and made accessible to server machine 120.

Sponsored content server 160 can be a rackmount server, a router computer, a personal computer, a portable digital assistant, a mobile phone, a laptop computer, a tablet computer, a camera, a video camera, a netbook, a desktop computer, a media center, any combination of the above, or any other such computing device capable of implementing the various features described herein. Sponsored content server 160 can include components such as sponsored content store 150. The components can be combined together or separated in further components, according to a particular implementation. It should be noted that in some implementations, various components of sponsored content server 160 may run on separate machines.

In certain implementations, sponsored content server 160 can be an advertisement serving system/service. Such an ad service system/service can receive requests for sponsored content from various content publishers, such as a video sharing sites and/or social networks. In response to requests from such content publishers, the ad serving system can provide various sponsored content items 151 (e.g., ads) for presentation within websites, applications, interfaces, etc., provided by such content publishers (e.g., to one or more users, such as via devices 102). In certain implementations, various content sponsors (e.g., advertisers) can provide compensation and/or other incentives to the ad serving service (e.g., on a per impression, per click, per conversion, etc. basis) in return for the ad serving service serving such ads to the various content publishers. In doing so, such content publishers can monetize their respective services (e.g., media sharing, social networking, etc.). Moreover, in certain implementations such content publishers can elect to share a portion of the revenue generated by the presentation of such sponsored content with various content creators that provide content (e.g., media content items) via the services provided by such content publishers (e.g., media sharing services, social networks, etc.). In doing so, a content publisher can further incentivize content creators to create and disseminate content (e.g., media content items) via a particular service (e.g., the media sharing service, social network, etc.).

Sponsored content store 150 can include sponsored content items 151A-151N. In certain implementations, sponsored content items 151A-151N can correspond to sponsored content (e.g., audio, video, images, display ads, banner ads, video ads, audio ads, interactive ads, etc.) provided by one or more third parties, such as advertisers. As noted, such advertisers provide compensation and/or other incentives to content publishers (e.g., media sharing sites, social networking sites, etc.) in return for such publishers providing sponsored content items 151 to users of a site or service of the publisher.

It should be understood that though FIG. 1 depicts server machine 120, sponsored content server 160, and devices 102, 104, and 106 as being discrete components, in various implementations any number of such components (and/or elements/functions thereof) can be combined, such as within a single component/system. For example, in certain implementations server machine 120 can incorporate features of the sponsored content server.

As described herein, upon receiving a media content item, such a media content item can be processed to identify a transition within the media content item. Having identified such a transition, a sponsored content item (e.g., an advertisement) can be provided during a presentation of the media content item and in relation to the transition. In certain implementations, such operations can be performed by and/or in conjunction with transition identification engine 130.

Figure 2:
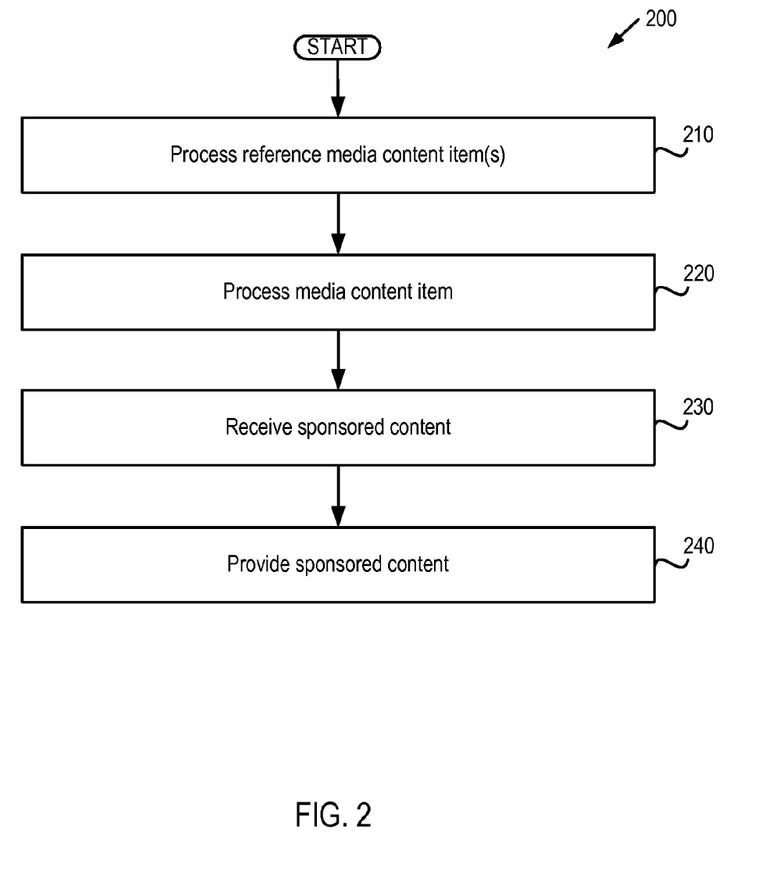
FIG. 2 depicts a flow diagram of aspects of a method for identifying transitions within media content items.

FIG. 2 depicts a flow diagram of aspects of a method 200 for identifying transitions within media content items. The method is performed by processing logic that may comprise hardware (circuitry, dedicated logic, etc.), software (such as is run on a general purpose computer system or a dedicated machine), or a combination of both. In one implementation, the method is performed by server machine 120 of FIG. 1, while in some other implementations, one or more blocks of FIG. 2 may be performed by another machine. For example, in various alternative implementations, the method can be performed at a social network 170 (i.e., the method or various aspects thereof can be performed locally at the social network 170 rather than in communication with a server such as server machine 120).

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 210, one or more media content items can be processed. In certain implementations, such media content items (e.g., a set of media content items, such as videos) can be media content items with respect to which a respective sponsored content item has been previously provided, such as during a presentation of the particular media content item. In doing so, one or more characteristics can be identified, such as with respect to one or more respective transitions present within one or more of the media content items.

For example, it can be appreciated that a media sharing service can include various media content items (e.g., videos) that may have been manually annotated (e.g., by human reviewers) with one or more content insertion indicators (e.g., annotations at various chronological points or intervals during a video that have been identified as points at which the video may be stopped/paused and sponsored content may be presented). It can be appreciated that such indicators are likely to correspond to various transitions or transition points present within such media content items (e.g., a scene change, etc.). As described herein, such transitions can be identified in order to enable the presentation of sponsored content items (e.g., advertisements) at points within the media content item that correspond to logical stops or breaks within the media content item (e.g., transitions from one scene to another, etc.). In doing so, viewers of the media content item can be presented with sponsored content items in a manner that does not interrupt the presentation of the media content item in an incoherent or unusually intrusive way (e.g., by stopping the presentation in the middle of a scene, during a dialogue, etc.). Accordingly, using such a collection of stored media content items (e.g., a set of videos) with respect to which transitions have already been identified (e.g., based on manual annotation), such media content items can be processed/analyzed, such as using one or more machine learning techniques, in order to identify one or more characteristics/features (e.g., visual characteristics, audio characteristics, temporal characteristics, semantic characteristics, viewership characteristics, etc.) that correspond to the transitions identified with respect to such media content items. Examples of such audio characteristics include but are not limited to: audio genre (music, speech, silence, noise, etc.), volume, and length. Examples of such visual features include but are not limited to: distance to an adjacent shot change, length of an adjacent shot, and brightness/color differences between shots.

At block 220, a media content item can be processed. For example, upon receiving a new media content item (e.g., via upload), a media sharing service can initially process/analyze such a media content item. In doing so, characteristics of the media content item (e.g., audio/visual characteristics) can be identified, thereby identifying one or more transitions within the media content item (e.g., in lieu of providing such a media content item for manual review). It should be understood that such a media content item can be, for example, a media content item (e.g., a video) provided by a content creator, such as to a media sharing service. It should also be understood that, in certain implementations, the transitions identified within the referenced media content item (e.g., a recently uploaded video) can be similar, comparable, and/or identical to one or more of the transitions identified in relation to a set of previously annotated content items (such as in the manner described at block 210).

Figure 3A:
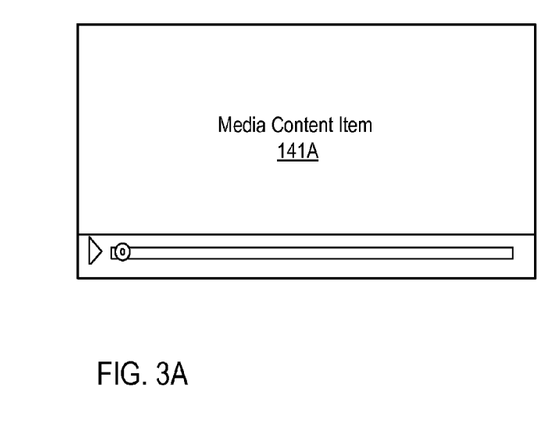
FIG. 3A depicts an exemplary media content item, in accordance with one implementation of the present disclosure.
Figure 3B:
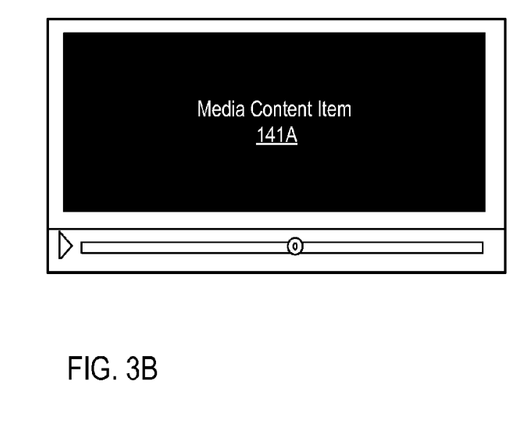
FIG. 3B depicts an exemplary media content item, in accordance with one implementation of the present disclosure.

In certain implementations, the referenced media content item (e.g., a media content item provided by a content creator to a media sharing service) can be processed to identify a transition within one or more images that are included within the media content item (e.g., one or more images or sets of images that are included/make up the media content item). By way of illustration, FIG. 3A depicts an exemplary media content item at one point in time (e.g., at one point during the duration of the media content item), while FIG. 3B depicts the same media content item at another point in time (e.g., at another point during the duration of the media content item). As can be appreciated with reference to FIGS. 3A and 3B, while FIG. 3A depicts a substantially white background, FIG. 3B depicts a substantially black background. Accordingly, the various images that make up the media content item can be processed, analyzed, etc., such as in order to determine the point during the media content item where such a transition (e.g., from the white background to the black background) takes place. Such a point can be identified as a likely transition or transition point within the media content item (it should be noted that, in certain implementations, multiple transitions can be identified within a single media content item).

Figure 4A:
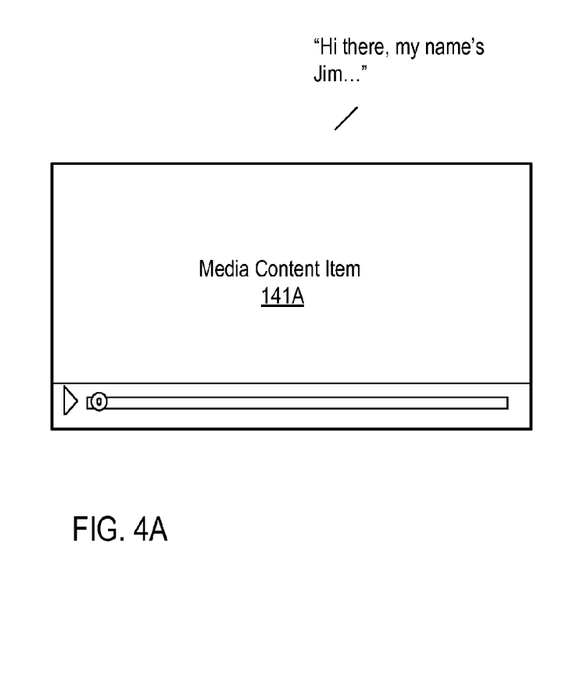
FIG. 4A depicts an exemplary media content item, in accordance with one implementation of the present disclosure.
Figure 4B:
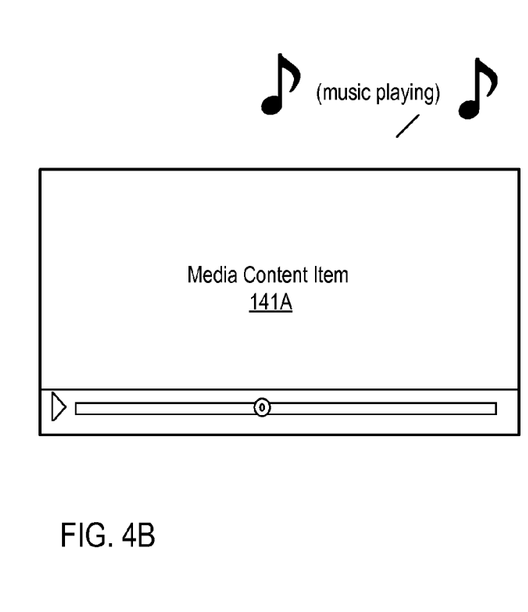
FIG. 4B depicts an exemplary media content item, in accordance with one implementation of the present disclosure.

Moreover, in certain implementations, the referenced media content item (e.g., a media content item provided by a content creator to a media sharing service) can be processed to identify a transition within audio content (e.g. an audio track) that is included/incorporated within the media content item. By way of illustration, FIG. 4A depicts an exemplary media content item at one point in time (e.g., at one point during the duration of the media content item), while FIG. 4B depicts the same media content item at another point in time (e.g., at another point during the duration of the media content item). As can be appreciated with reference to FIGS. 4A and 4B, while FIG. 4A depicts a point in the media content item during which dialogue is taking place (e.g., "Hi there . . . "), FIG. 4B depicts a point in the media content item during which music is taking place. Accordingly, the audio included in such a media content item can be processed, analyzed, etc., such as in order to determine the point during the media content item where such a transition (e.g., from dialogue to music) takes place. Such a point can be identified as a likely transition or transition point within the media content item (it should be noted that, in certain implementations, multiple transitions can be identified within a single media content item).

In certain implementations, various characteristics of the media content item (e.g., a media content item provided by a content creator to a media sharing service) can be processed with respect/in relation to the one or more characteristics of the one or more respective transitions (e.g., those transitions identified at block 210, such as are identified with respect to various previously stored media content items). In doing so, one or more transitions can be identified within the media content item (e.g., the media content item provided by a content creator to a media sharing service), such as based on the one or more respective transitions identified within the respective media content items (e.g., the transitions identified with respect to various previously stored media content items, such as at block 210). That is, having processed (e.g., at block 210) various previously stored media content items (e.g., those that underwent manual review in order to identify transitions within them) and identified various characteristics (and/or groups of characteristics) (e.g., visual characteristics, audio characteristics, composite characteristics, etc.) that correspond to the (manually identified) transitions, other media content items (e.g., newly uploaded media content items and/or media content items with respect to which transitions have not been identified) can be processed in order to identify comparable characteristics within such media content items. In doing so, transitions can be identified within such media content items as well (e.g., at intervals that correspond to the same/comparable characteristics).

By way of illustration, a set of content items (e.g., ~1000 videos) can be selected, such as from a variety of verticals. For each video, shot cuts can be generated, such as using a shot change filter. Additionally, in certain implementations, in scenarios in which multiple transitions are identified within a relatively short time interval (e.g., if two or more transitions are identified within one second, ten seconds, one minute, etc., of one another), a single one of such transitions can be selected (in order to minimize the stopping of a presentation of the video multiple times within a short time interval). Additionally, in certain implementations the identified transitions can also be provided to evaluators/administrators who can further review the accuracy of the identified transition and provide feedback regarding the suitability of the identified transition for providing sponsored content. Based on such feedback (e.g., based on a majority and/or consensus of several reviewers with respect to the identified transition, a final determination as to the suitability of the identified transition for providing a sponsored content item can be computed. Moreover, in certain implementations, having identified the referenced transitions, characteristics of such transitions can be compared with other content items that have been manually annotated with content insertion indicator(s) (which may be the same or a different set of content items than those processes at block 210). In doing so, those transition(s) identified at block 220 can be tested and/or verified against manually annotated media content items.

At block 230, a sponsored content item can be received. Such a sponsored content item can be, for example, one or more types of advertisement, such as a video advertisement, and can be received from an ad serving service such as sponsored content server 160. It should be understood that, in certain implementations, the referenced sponsored content item can be selected by sponsored content server 160 from a set of sponsored content items and provided to the server 120 or the social network 170 (or served to the user/content viewer device in response to instructions from the server 120 or the social network 170). For example, sponsored content items such as ads can be auctioned to determine what ads should be returned to the server 120 and/or the order in which they should be presented to the user. This determination may depend on, for example, other advertisers' bids (e.g., the maximum amount an advertiser will pay per user click on an advertisement) and/or the performance scores of the ads. The performance score of an ad may be calculated based on, for example, historical click-through rates, relevance of an advertiser's ad text and keywords, an advertiser's account history, etc. In another implementation, the ads are selected by the sponsored content server 160 on a reservation basis (e.g., based on predefined conditions) without taking into account other advertisers' bids and/or the performance scores of the ads.

At block 240, the sponsored content item can be provided. In certain implementations, such a sponsored content item (e.g., an advertisement such as a video advertisement) can be provided in relation to a transition (e.g., at a particular chronological interval) identified within the media content item (e.g., as identified at block 220). Moreover, in certain implementations such a sponsored content item can be provided during a presentation of the media content item (e.g., at a transition identified within the duration of the media content item, at which point the media content item can be paused, the sponsored content item can be presented, and the media content item can then be resumed).

In certain implementations, such a sponsored content item can be provided prior to a chronological interval of the media content item, such as a chronological interval identified at block 220. That is, being that a transition can be identified within the media content item based on an identified chronological interval of the media content item (e.g., one or more points in time) during which various viewers stop viewing the media content item, it can be further determined that at one or more points prior to such an interval, viewers continue to be engaged with the media content item. As such, a sponsored content item can be provided prior to the identified transition (i.e., the point at which some viewers can be determined to lose interest). In doing so, content sponsors can ensure that their sponsored content items are more likely to be viewed, as viewers of the media content item are likely to be interested in viewing more of the media content item (e.g., after the completion of the sponsored content item).

Figure 5:
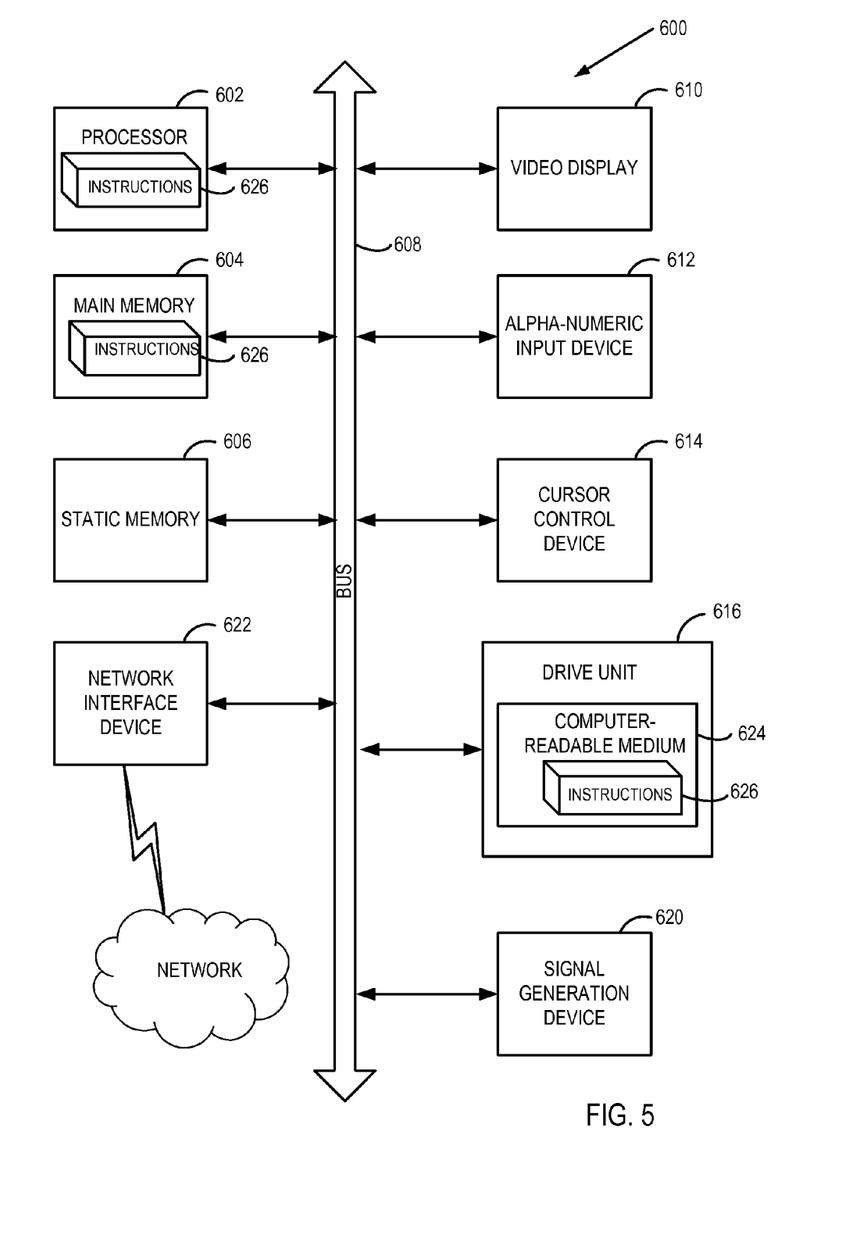
FIG. 5 depicts a block diagram of an illustrative computer system operating in accordance with aspects and implementations of the present disclosure.

FIG. 5 depicts an illustrative computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of instructions 626 (e.g., instructions executed by collaboration manager 225, etc.) embodying any one or more of the methodologies or functions described herein. Instructions 626 may also reside, completely or at least partially, within the main memory 604 and/or within the processor 602 during execution thereof by the computer system 600, the main memory 604 and the processor 602 also constituting computer-readable media. Instructions 626 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "processing," "defining," "distributing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Moreover, the techniques described above could be applied to other types of data instead of, or in addition to, media clips (e.g., images, audio clips, textual documents, web pages, etc.). The scope of the disclosure should, therefore, be determined with reference to the appended claims, along with the full scope of equivalents to which such claims are entitled.

What is claimed is:

1. A method comprising:
 processing a reference media content item with respect to which a first sponsored content item has been previously presented at a chronological interval of the reference media content item to identify one or more characteristics of the reference media content item that are associated with a previously identified transition within the reference media content item, the transition corresponding to the chronological interval of the reference media content item;
 processing, by a processing device, a new media content item using the one or more characteristics of the reference media content item that are associated with the previously identified transition within the reference media content item to identify a transition within the new media content item at a chronological interval of the new media content item;
 receiving a second sponsored content item; and
 during a presentation of the new media content item, providing the second sponsored content item at the identified chronological interval of the new media content item.

2. The method of claim 1, wherein processing the reference media content item comprises processing the reference media content item to identify a previously identified transition within one or more images that are included within the reference media content item.

3. The method of claim 1, wherein processing the reference media content item comprises processing the reference media content item to identify a previously identified transition within audio content that is included within the reference media content item.

4. The method of claim 1, wherein processing the reference media content item comprises processing the reference media content item to identify a previously identified transition within audio content and video content that are included within the first media content item.

5. The method of claim 1, wherein processing the reference media content item comprises processing a plurality of reference media content items, each of the reference media content items being associated with a respective previously identified transition, to identify one or more characteristics associated with the respective previously identified transitions.

6. The method of claim 1, wherein the reference media content item is associated with a content insertion indicator that corresponds to the previously identified transition.

7. A system comprising:
 a memory; and
 a processing device, coupled to the memory, to:
  process a reference media content item with respect to which a first sponsored content item has been previously presented at a chronological interval of the reference media content item to identify one or more characteristics of the reference media content item that are associated with a previously identified transition within the reference media content item, the previously identified transition corresponding to the chronological interval of the reference media content item;
  process a new media content item using the one or more characteristics of the reference media content item that are associated with the previously identified transition within the reference media content item to identify a transition within the new media content item at a chronological interval of the new media content item;
  receive a second sponsored content item; and,
  during a presentation of the new media content item, provide the second sponsored content item at the identified chronological interval of the new media content item.

8. The system of claim 7, wherein to process the reference media content item is to process the reference media content item to identify a previously identified transition within one or more images that are included within the reference media content item.

9. The system of claim 7, wherein to process the reference media content item is to process the reference media content item to identify a previously identified transition within audio content that is included within the reference media content item.

10. The system of claim 7, wherein to process the reference media content item is to process the reference media content item to identify a previously identified transition within audio content and video content that are included within the reference media content item.

11. The system of claim 7, wherein to process the reference media content item is to process a plurality of reference media content items, each of the reference media content items being associated with a respective previously identified transition, to identify one or more characteristics associated with the respective previously identified transitions.

12. The system of claim 7, wherein the reference media content item is associated with a content insertion indicator that corresponds to the previously identified transition.

13. A non-transitory computer readable medium having instructions stored thereon that, when executed by a processor, cause the processor to:
  process a reference media content item with respect to which a first sponsored content item has been previously presented at a chronological interval of the reference media content item to identify one or more characteristics of the reference media content item that are associated with a previously identified transition within the reference media content item, the previously identified transition corresponding to the chronological interval of the reference media content item;
  process a new media content item using the one or more characteristics of the reference media content item that are associated with the previously identified transition within the reference media content item to identify a transition within the new media content item at a chronological interval of the new media content item;
  receive a second sponsored content item; and,
  during a presentation of the new media content item, provide the second sponsored content item at the identified chronological interval of the new media content item.

14. The non-transitory computer readable medium of claim 13, wherein to process the reference media content item is to process the reference media content item to identify a previously identified transition within one or more images that are included within the reference media content item.

15. The non-transitory computer readable medium of claim 13, wherein to process the reference media content item is to process the reference media content item to identify a previously identified transition within audio content that is included within the reference media content item.

16. The non-transitory computer readable medium of claim 13, wherein to process the reference media content item is to process the reference media content item to identify a previously identified transition within audio content and video content that are included within the reference media content item.

17. The non-transitory computer readable medium of claim 13, wherein to process the reference media content item is to process a plurality of reference media content items, each of the reference media content items being associated with a respective previously identified transition, to identify one or more characteristics associated with the respective previously identified transitions.

18. The non-transitory computer readable medium of claim 13, wherein the reference media content item is associated with a content insertion indicator that corresponds to the previously identified transition.

* * * * *